R. E. BYRD.
MEASURING INSTRUMENT.
APPLICATION FILED AUG. 18, 1917.
1,286,224.
Patented Dec. 3, 1918.
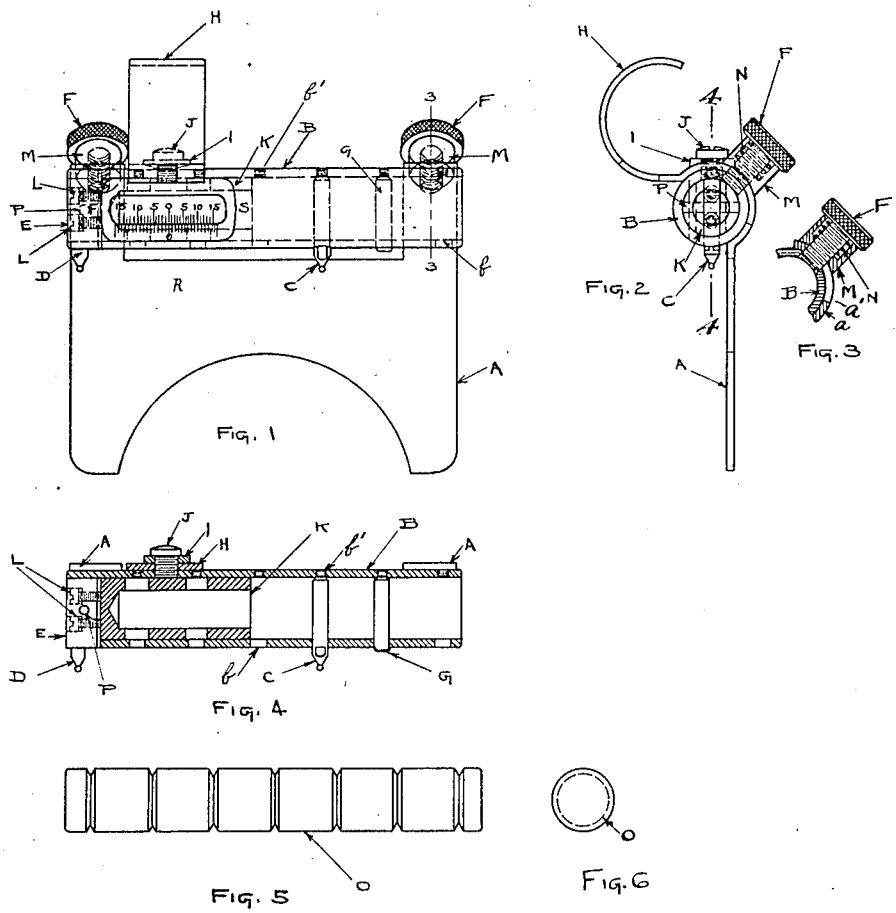

UNITED STATES PATENT OFFICE.

ROBERT E. BYRD, OF ERIE, PENNSYLVANIA, ASSIGNOR TO MODERN TOOL COMPANY, OF ERIE, PENNSYLVANIA, A CORPORATION OF PENNSYLVANIA.

MEASURING INSTRUMENT.

1,286,224.    Specification of Letters Patent.    Patented Dec. 3, 1918.

Application filed August 18, 1917. Serial No. 186,853.

*To all whom it may concern:*

Be it known that I, ROBERT E. BYRD, a citizen of the United States, residing at Erie, in the county of Erie and State of Pennsylvania, have invented new and useful Improvements in Measuring Instruments, of which the following is a specification.

This invention relates to measuring instruments and consists in certain improvements in the construction thereof as will be hereinafter fully described and pointed out in the claims.

More particularly the invention relates to instruments designed for measuring the distances between the threads or grooves so as to determine with accuracy the spaces or pitch of said threads or grooves.

The invention is illustrated in the accompanying drawings as follows:—

Figure 1 shows a plan view of the instrument.

Fig. 2 a side elevation of the same.

Fig. 3 a section of a fragment of the instrument on the line 3—3 in Fig. 1.

Fig. 4 a section on the line 4—4 in Fig. 2.

Fig. 5 a plan view of the master gage.

Fig. 6 an end view of said gage.

The instrument has two members slidingly mounted relatively to each other, one in the form of a sleeve B and the other in the form of a plunger K. The plunger and sleeve have graduations forming a Vernier scale R. These give a reading of .0005 of an inch using the Vernier scale of measuring, the lines on the sleeve being .025" apart and the plunger K .024" apart. The sleeve has a series of openings $b$ along its face and a series of screw-threaded openings $b'$ opposite the openings $b$. A ball-pointed measuring pin C is secured to the sleeve by passing the end of this pin through an opening $b$ and screwing it into the opening $b'$.

A ball-pointed measuring pin D is mounted on the plunger K. This pin is preferably adjustable relatively to the plunger so as to correct its position relatively to the scale. To accomplish this the pin D is carried by a block E. The block E extends into a transverse slot in the end of the plunger K and is pivotally mounted in the slot by means of a pin P. Screws L extend through the block E, one at each side of the pin P. By adjusting these screws the block E may be swung so as to move the point D to the right or left so as to properly position it to give a zero reading on the scale when the points are corrected with the master gage O, the master gage O having grooves accurately distanced for this purpose.

A rest plate A is adjustably secured to the sleeve B. The purpose of this plate is to form a support for an article, the grooves in which are being measured. Such an article, as for instance, a screw, is placed on the plate, and the points are adjusted so as to bring the pins carrying the points into a radial direction relatively to the axis of the screw. The plate is locked in this position and in this manner the article can be readily held relatively to the points and a reading taken.

The plate has the lips $a$ which extend partly around the sleeve B. A screw F extends through a slot $a'$ in the plate and into the sleeve. A washer M having a concave face to fit the lip is placed between the lip $a$ and the head of the screw. A spring N is arranged in a cavity in the washer to hold the washer in place as the screw is loosened. There is preferably one of these adjusting screws in each lip and there is one lip at each end of the sleeve. By loosening these screws the sleeve may be swung in the lip, the springs giving a slight frictional resistance to this movement so as to hold it in place as the screws are tightened. When the proper adjustments are made the screws are tightened and the parts thus locked.

For convenience of the operator I provide a thumb-hold clip H which is secured to the sleeve by means of a screw J. The washer I having a concave face is arranged between the screw J and the plate.

What I claim as new is:—

1. In a measuring instrument, the combination of two relatively slidable members comprising a sleeve and a plunger within the sleeve; a measuring point on each member, the point on the sleeve being detachably connected and the sleeve having a series of means for attaching the point to vary the measuring distances between the points; and a scale for indicating the relative movement of the members.

2. In a measuring instrument, the combination of two relatively slidable members comprising a sleeve and a plunger within the sleeve, one of said members having a transverse slot; a measuring point on each member, one of said points being swingingly mounted in the slot; screws on the point mounted in the slot at each side of its pivot for locking the screw in adjustment; and a scale for indicating the relative movement of the members.

3. In a measuring instrument, the combination of two relatively slidable members; a measuring point on each member; a scale indicating the relative movement of the members; and a rest plate secured to said members in position to support an object in measuring relation to said points, said plate being in a plane parallel to a line between the points.

4. In a measuring instrument, the combination of two relatively slidable members; a measuring point on each member; a scale indicating the relative movement of the members; a rest plate secured to said members in position to support an object in measuring relation to said points; and means for adjusting the plate to vary the distances between the plate and point.

5. In a measuring instrument, the combination of two relatively slidable members; a measuring point on each member; a scale indicating the relative movement of the members; and a rest plate secured to one of said members in position to support an object in measuring relation to said points, said plate being swingingly mounted to adjust its position relatively to said points.

6. In a measuring instrument, the combination of two relatively slidable members; a measuring point on each member; a scale indicating the relative movement of the members; a rest plate secured to one of said members in position to support an object in measuring relation to said points, said plate being swingingly mounted to adjust its position relatively to said points; and means for locking the plate in adjustment.

7. In a measuring instrument, the combination of two relatively slidable members; a measuring point on each member; a scale indicating the relative movement of the member; a rest plate secured to one of said members in position to support an object in measuring relation to said points, said plate being swingingly mounted to adjust its position relatively to said points; a screw for locking the plate in adjustment; and a spring-pressed washer between the screw and plate.

8. In a measuring instrument, the combination of two relatively slidable members; a measuring point on each member; a scale indicating the relative movement of the members; a rest plate secured to said members in position to support an object in measuring relation to said points; and a thumb grip plate opposite the rest plate.

In testimony whereof I have hereunto set my hand.

ROBERT E. BYRD.

Copies of this patent may be obtained for five cents each, by addressing the "Commissioner of Patents, Washington, D. C."